US008533849B2

(12) United States Patent  
Jin et al.

(10) Patent No.: US 8,533,849 B2
(45) Date of Patent: Sep. 10, 2013

(54) TRAITOR TRACING IN A CONTENT PROTECTION SYSTEM

(75) Inventors: Hongxia Jin, San Jose, CA (US); Serdar Pehlivanoglu, Kayseri (TR)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 12/877,001

(22) Filed: Sep. 7, 2010

(65) Prior Publication Data
US 2012/0060223 A1 Mar. 8, 2012

(51) Int. Cl.
*H04L 29/06* (2006.01)

(52) U.S. Cl.
USPC ........... 726/26; 726/27; 726/28; 726/29; 726/30; 726/32; 726/33; 713/161; 713/163; 713/170; 713/176; 713/179; 713/180; 713/181; 713/187; 380/201; 380/202; 380/203; 380/239; 380/240; 380/241; 380/242; 705/51; 705/57; 705/58; 709/224; 709/225; 709/229

(58) Field of Classification Search
USPC ............. 726/26–33, 1, 11–14; 713/168–181, 713/187, 161–163; 380/200–203, 239–242; 709/223–229; 715/51, 57–59
See application file for complete search history.

(56) References Cited

U.S. PATENT DOCUMENTS

| 7,711,114 | B2 | 5/2010 | Lotspiech et al. | |
|---|---|---|---|---|
| 2004/0098593 | A1* | 5/2004 | Muratani | 713/176 |
| 2004/0111611 | A1* | 6/2004 | Jin et al. | 713/163 |
| 2007/0165853 | A1 | 7/2007 | Jin et al. | |
| 2007/0220575 | A1* | 9/2007 | Cooper et al. | 725/118 |
| 2008/0137848 | A1 | 6/2008 | Kocher et al. | |
| 2009/0049560 | A1 | 2/2009 | Lotspiech et al. | |
| 2009/0320130 | A1 | 12/2009 | Jin et al. | |
| 2009/0323936 | A1 | 12/2009 | Jin et al. | |
| 2010/0043081 | A1 | 2/2010 | Kiayias et al. | |
| 2010/0111355 | A1 | 5/2010 | Petrovic et al. | |
| 2011/0122255 | A1* | 5/2011 | Haritaoglu | 348/180 |

OTHER PUBLICATIONS

Threshold Traitor Tracing by Naor et al; Publisher: Springer Link; Year: 1998.*
Fully Collusion Resistant Traitor Tracing with Short Ciphertexts and Private Keys by Boneh et al; Publisher: Springer Link; Year: 2006.*
Efficient Traitor Tracing from Collusion Secure Codes by Billet et al; Publisher: Springer-Verlag Berlin Heidelberg; Year: 2008.*

(Continued)

*Primary Examiner* — Madhuri Herzog
(74) *Attorney, Agent, or Firm* — Jeffrey T. Holman

(57) ABSTRACT

A method for detecting at least one traitor computer system among a plurality of receiver computer systems including: assigning a version of protected content to each of the plurality of receiver computer systems that are currently identified as innocent by a content protection system that monitors distribution of protected content to the plurality of receiver computer systems; recovering at least one unauthorized rebroadcast of the content; generating a score for each of the plurality of receiver computer systems with respect to the recovered unauthorized rebroadcast; calculating a threshold independent of an estimation of maximum traitor computer systems; checking a highest score against the threshold; incriminating a receiver computer system having the highest score above the threshold as a traitor computer system; and removing any unauthorized rebroadcasts overlapping with the traitor computer system. The process may be repeated from generating scores until all traitors are identified.

18 Claims, 4 Drawing Sheets

(56) References Cited

OTHER PUBLICATIONS

"Advanced Access Content System" AACS Specifications, available at: http://www.aacsla.com/specifications/, last accessed Nov. 18, 2010, 2 pages.

Fiat et al. "Dynamic Traitor Tracing" Journal of Cryptology, vol. 14, (2001), pp. 211-223.

Jin et al. "Efficient Coalition Detection in Traitor Tracing" IFIP International Federation for Information Processing, Proceedings of the IFIP TC 11 23rd International Information Security Conference, vol. 278, (2008), pp. 365-379.

Jin et al. "Renewable Traitor Tracing: A Trace-Revoke-Trace System for Anonymous Attack" Computer Security—ESORICS 2007, Lecture Notes in Computer Science, vol. 4734, (2007), pp. 563-577.

Kiayias et al. "Tracing and Revoking Pirate Rebroadcasts" Applied Cryptography and Network Security, Lecture Notes in Computer Science, vol. 5536, (2009), pp. 253-271.

Le et al. "Short c-Secure Fingerprinting Codes" Information Security Conference 2003, LNCS, vol. 2851, (2003), pp. 422-427.

Naor et al. "Revocation and Tracing Schemes for Stateless Receivers" CRYPTO '01, Proceedings of the 21st Annual International Cryptology Conference on Advances in Cryptology, (2001), pp. 41-62.

Safavi-Naini et al. "Sequential Traitor Tracing" CRYPTO '00, Proceedings of the 20th Annual International Cryptology Conference on Advances in Cryptology, (2000), pp. 316-332.

Safavi-Naini et al. "Sequential Traitor Tracing" IEEE Transactions on Information Theory, vol. 49, Issue 5, (May 2003), pp. 1319-1326.

Staddon et al. "Combinatorial Properties of Flameproof and Traceability Codes" IEEE Transactions on Information Theory, vol. 47, Issue 3, (Mar. 2001), pp. 1042-1049.

Stinson et al. "Combinatorial Properties and Constructions of Traceability Schemes and Frameproof Codes" SIAM Journal on Discrete Mathematics, vol. 11, Issue 1, (1998), pp. 41-53.

Tardos "Optimal Probabilistic Fingerprint Codes" Proceedings of the 35th Annual ACM Symposium on Theory of Computing, (2003), pp. 116-125.

Fernandez et al. "Tracing Traitors by Guessing Secrets. The q-Ary Case" Information Security Practice and Experience, Lecture Notes in Computer Science, vol. 3439, (2005), pp. 61-73.

Jin et al. "Traitor Tracing for Prerecorded and Recordable Media" ACM Workshop on Digital Rights Management, Proceedings of the 4th ACM Workshop on Digital Rights Management, Marking and Tracing Methods, (2004), pp. 83-90.

Jin et al. "Traitor Tracing Without A Priori Bound on the Coalition Size" Proceedings of the 12th International Conference on Information Security, Distributed System Security, Lecture Notes in Computer Science, vol. 5735, (2009), pp. 234-241.

Yoshida et al. "A Subscriber-Excluding and Traitor-Tracing Broadcast Distribution System" IEICE Transactions on Fundamentals of Electronics, Communications and Computer Sciences, vol. E84-A, No. 1, (Jan. 2001), pp. 247-255.

\* cited by examiner

TRAITOR TRACING IN A CONTENT PROTECTION SYSTEM

BACKGROUND

Media and other content—such as music, movies, and literature, among others—that may typically be distributed to a large number of destinations are commonly distributed in a digital format over the Internet or other remote electronic or wireless communication medium. One of the principal problems that distributors of digital content face is unauthorized copying and redistribution of protected digital content, commonly known as piracy. Because of the widespread piracy problems, many content distributors seek to minimize the financial impact of piracy by implementing traitor tracing in their content protection systems.

Traitor tracing is a mechanism that detects guilty users who have participated in a pirate attack when pirate evidences become available. Authorized receivers that distribute protected content outside of authorized distribution channels are considered to be traitors. Different tracing schemes are used for different types of pirate attacks. One particular pirate attack that is frequently used is a rebroadcasting attack, in which the attackers redistribute content encrypting keys or decrypted plain content in an attempt to remain anonymous. When the version of content is the same between all receivers, the encrypting keys cannot be used to identify the traitors in a rebroadcasting attack.

Conventional content protection systems attempt to detect such attacks by distributing many versions of the content and by using watermarking and encryptions on various segments of the content. The content protection systems assign different versions to different receiver systems. This aids in identifying the traitor computer systems that is the source of the pirate rebroadcasts of the protected content.

Once a rebroadcast pirate attack is found, and the traitor tracing scheme identifies a particular computer system or group of systems as responsible for the attack, the distributor may then revoke access to the content for the identified system(s) and/or institute legal proceedings against individuals involved.

SUMMARY

Embodiments of a computer program product are described. In one embodiment, the computer program product is stored on a computer readable storage, in which the computer readable program, when executed on a computer, causes the computer to perform operations for detecting at least one traitor computer system among a plurality of receiver computer systems subject to a content protection system that monitors distribution of protected content to the plurality of receiver computer systems. The operations include assigning a version of the content to each of the plurality of receiver computer systems that are currently identified as innocent; recovering at least one unauthorized rebroadcast of the content; generating a score for each of the plurality of receiver computer systems with respect to the recovered unauthorized rebroadcast; calculating a threshold independent of an estimation of maximum traitor computer systems; checking a highest score against the threshold; incriminating a receiver computer system having the highest score above the threshold as a traitor computer system; and removing any unauthorized rebroadcasts overlapping with the traitor computer system. According to one embodiment, after removing the overlapping unauthorized rebroadcasts, the process of generating scores, calculating a threshold, checking the generated scores against the threshold, and incriminating traitors is repeated until no scores are above the threshold. Other embodiments of the computer program product are described.

Embodiments of a method are also described. In one embodiment, the method is a method for detecting at least one traitor computer system among a plurality of receiver computer systems. The method includes assigning a version of the content to each of the plurality of receiver computer systems that are currently identified as innocent by a content protection system that monitors distribution of protected content to the plurality of receiver computer systems; recovering at least one unauthorized rebroadcast of the content; generating a score for each of the plurality of receiver computer systems with respect to the recovered unauthorized rebroadcast; calculating a threshold independent of an estimation of maximum traitor computer systems; checking a highest score against the threshold; incriminating a receiver computer system having the highest score above the threshold as a traitor computer system; and removing any unauthorized rebroadcasts overlapping with the traitor computer system. According to one embodiment, after removing the overlapping unauthorized rebroadcasts, the process of generating scores, calculating a threshold, checking the generated scores against the threshold, and incriminating traitors is repeated until no scores are above the threshold. Other embodiments of the method are described.

Embodiments of a system are described. In one embodiment, the system is a system for tracing traitor computer systems in a content distribution system. The content distribution system includes a content protection system at least partially implemented on a computer device that includes a storage device, a processor, and memory. The content protection system also includes an assignment subsystem, a recovery subsystem, and an evaluator subsystem. The assignment subsystem assigns a version of protected content to each of a plurality of receiver computer systems currently identified as innocent. The recovery subsystem recovers at least one unauthorized rebroadcast of the content. The evaluator subsystem is configured to generate a score for each of the plurality of receiver computer systems with respect to the recovered unauthorized rebroadcast; calculating a threshold independent of an estimation of maximum traitor computer systems; checking a highest score against the threshold; incriminating a receiver computer system having the highest score above the threshold as a traitor computer system; and removing any unauthorized rebroadcasts overlapping with the traitor computer system. According to one embodiment, after removing the overlapping unauthorized rebroadcasts, the process of generating scores, calculating a threshold, checking the generated scores against the threshold, and incriminating traitors is repeated until no scores are above the threshold. Other embodiments of the system are described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
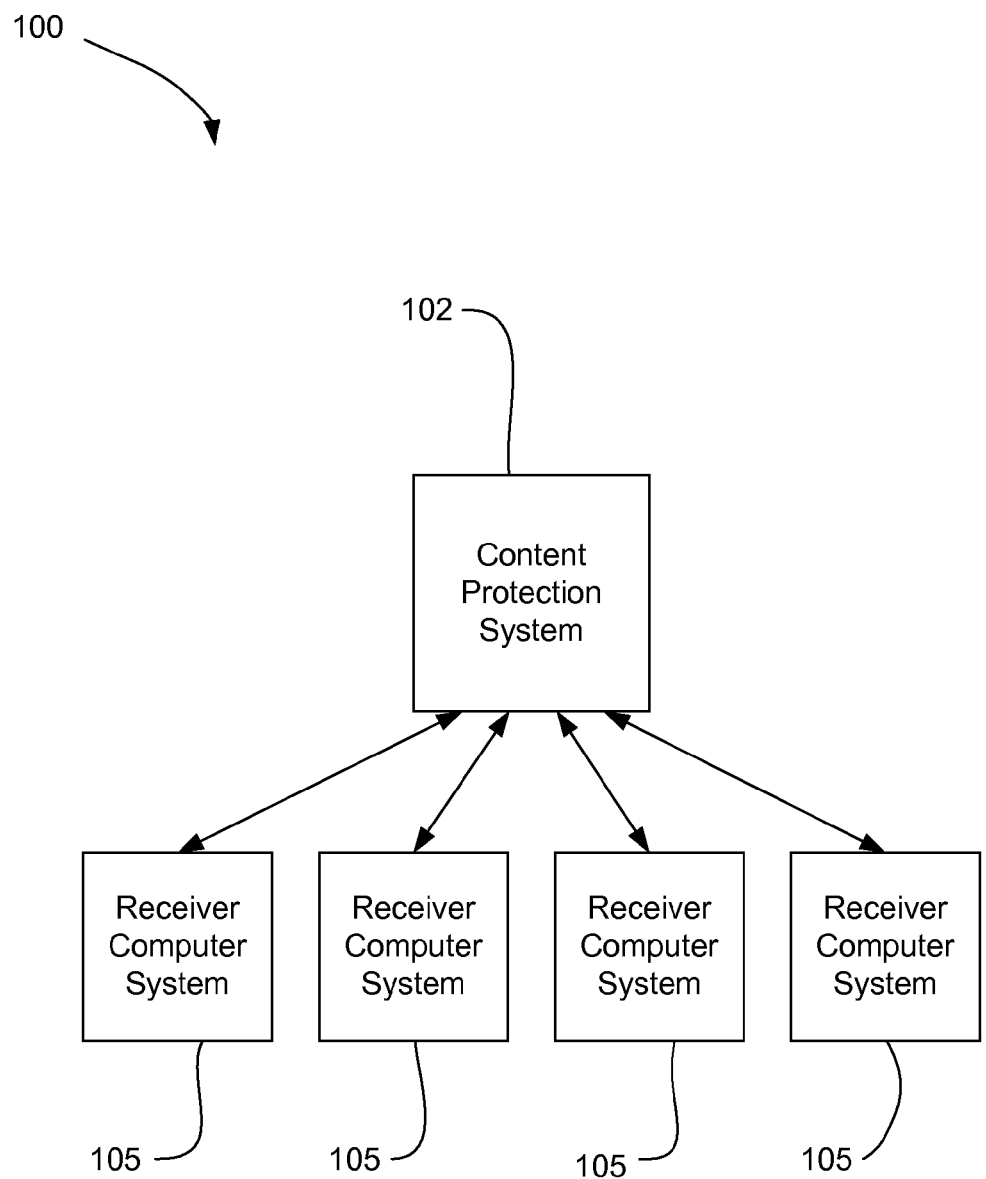
FIG. 1 depicts a schematic diagram of one embodiment of a content distribution system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system for detecting a traitor computer system among a plurality of receiver computer systems subject to a content protection system that monitors distribution of protected content to the plurality of receiver computer systems. Embodiments of the system as described herein use a traitor tracing scheme that provides improvements over previous systems and methods for identifying one or more traitor computer systems with respect to protected content received from a content protection system. More specifically, the traitor tracing scheme of the present specification incriminates traitor computer systems based on scores for each of the receiver computer systems as compared to a threshold that is determined independent of an estimation of maximum traitor computer systems or coalition size. In contrast, thresholds in conventional traitor detection schemes are dependent on an a priori bound on the coalition size.

As used herein and in the appended claims, the term "content" refers generally to digital content that is distributed from a source to one or more receiver computer systems. The content may be distributed through any suitable digital communications media, such as the Internet, among others. "Protected content" is content that may include encryption or other digital protections intended to limit or prevent unauthorized reproduction, rebroadcasting, or redistribution of the content.

Also as used herein and in the appended claims, the term "pirate rebroadcast" refers generally to an illegitimate or unauthorized transfer of encryption keys of protected content or decrypted plain content from a receiver computer system that received an original broadcast of the content and encryption keys to another receiver computer system. All pirate rebroadcasts are unauthorized uses of protected content.

FIG. 1 depicts a schematic diagram of one embodiment of a content distribution system 100. The illustrated content distribution system 100 includes a content protection system 102 in communication with a plurality of receiver computer systems 105. The content protection system 102 distributes content to the receiver computer systems 105 that have authorization to acquire the content. The authorization of each receiver computer system 105 may be checked each time a receiver computer system 105 makes a request for new content.

According to some embodiments, the content protection system 102 may be a part of a larger distribution system in which digital content is distributed, or broadcast, from one or more source systems (not shown) to one or more receiver computer systems 105. According to another embodiment, the content protection system 102 includes a distribution subsystem that manages the distribution of authorized content.

Digital content broadcast by the content distribution system 100 includes many types of media that were originally distributed as analog content, as well as content developed solely or primarily in digital format. Some examples of digital content that are increasingly being distributed in digital format over the Internet include movies, music, books, journals, and others. In one embodiment, the content distribution system 100 includes a database of movie selections in digital format. The content distribution system 100 allows consumers to select one or more movies to download from the database for viewing on their personal computers. The downloadable content may include code with a time stamp, such that the consumer has a certain amount of time to view the movie, after which time the content is automatically removed from the customer's local storage or becomes unplayable. This type of distribution system may allow customers to "rent" movies without going to a store for a physical copy of the movie, while also preventing the consumers from keeping the movies indefinitely. Other embodiments of content distribution systems 100 may implement the principles described herein.

Figure 2:
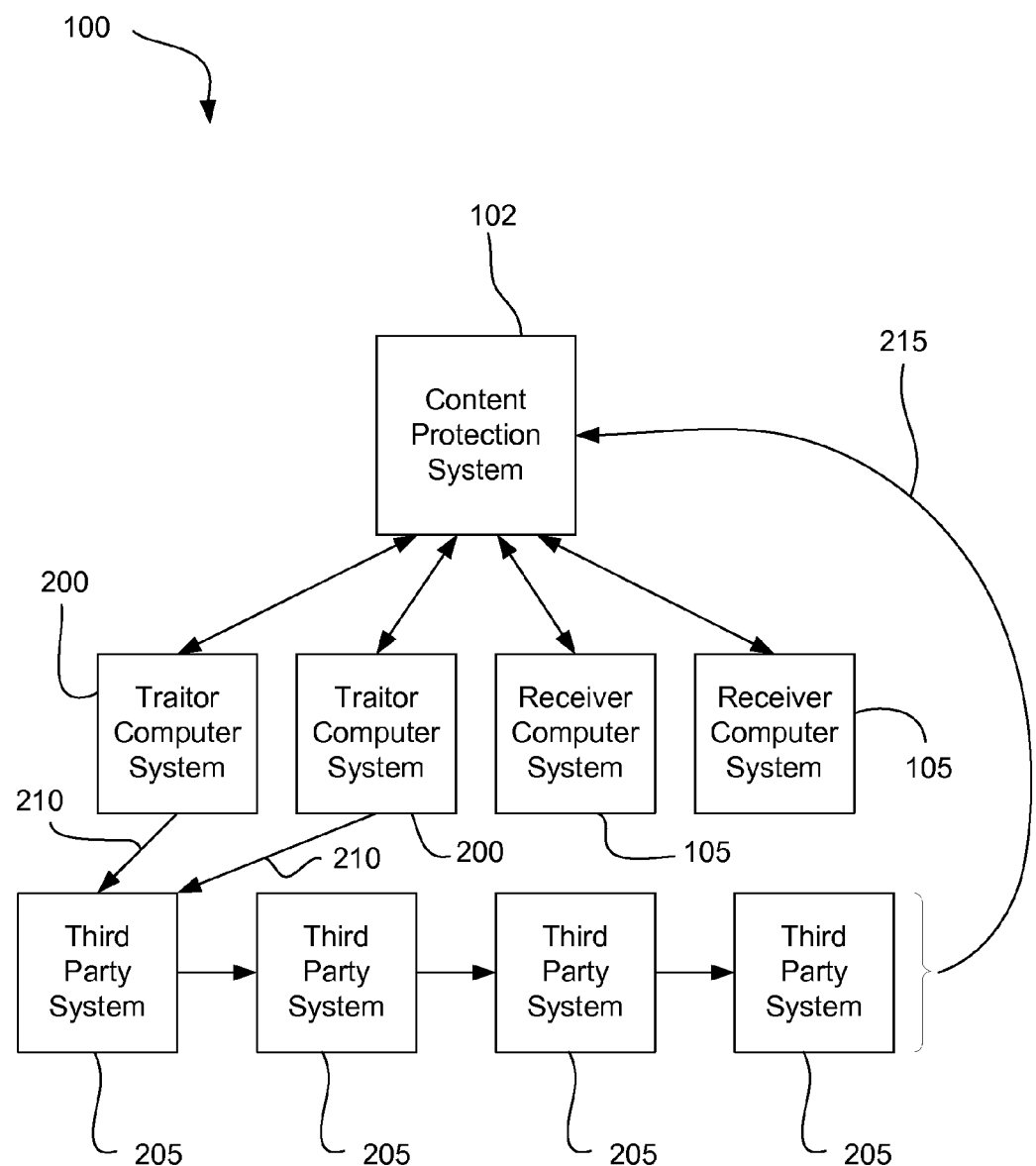
FIG. 2 depicts a schematic diagram of one embodiment of a traitor tracing scheme in a content distribution system.

FIG. 2 depicts a schematic diagram of one embodiment of a traitor tracing scheme in the content distribution system 100 of FIG. 1. Due to the digital nature of such content, the content may more easily be reproduced and redistributed unlawfully or without authorization to third-party systems 205, whether over the Internet or otherwise. Consequently, one approach to make digital content more difficult to copy and/or redistribute is through access control technologies. Even with content protection, however, many users are able to circumvent the protections and still distribute pirated content, which makes employment of a traitor tracing scheme desirable.

One embodiment of an access control technology used to protect digital content sends out different versions of a certain file or groups of files related to the content to different consumers. By sending different versions to the receiver computer systems 105, the content protection system 102 is better able to keep track of which version is sent to each receiver computer system 105, thereby improving the ability to trace pirated broadcasts. In one embodiment, each version of the content may be uniquely encrypted to easily distinguish one version of content from another.

Due to the greater computing and transmission requirements to produce, store, and transmit individualized content that has been uniquely encrypted for each separate receiver computer system 105, another embodiment may include different versions of file segments within the content in order to reduce the storage space and transmission requirements. Decryption keys for the file segments are sent to the receiver computer system 105 for the version of content so that the receiver computer system 105 is able to successfully decrypt the content.

Typically, a pirated rebroadcast 210 of the content or decrypting keys that is wholly derived from one version of the content that was sent to a single receiver computer system 105 may be fairly easily traced, such that a content protection system 102 is able to identify a receiver computer system 105 as the traitor computer system 200. However, rebroadcast attacks that involve more than one receiver computer system 105 are more complicated to trace, given that the resulting content may be a combination of several versions of the content from multiple authorized receiver computer systems 105. Because the pirated rebroadcast from more than one source is a combination of more than one version of content sent to more than one receiver computer system 105, the traitor computer system(s) 200 may not be identifiable simply by comparing the pirated rebroadcast 210 against a single, original version of the content. Instead, the pirated rebroadcast 210 is likely to include encrypted segments from many different versions, making it much more difficult to accurately identify all of the traitor computer systems 200 involved in the pirated rebroadcast 210.

A group of several traitor computer systems 200 that collude to produce a single piece of content based on various different versions of the content—which were each legitimate original versions sent to different receiver computer systems 105—is referred to herein as a coalition. One example of pirated rebroadcasting of content by many different receiver computer systems 105 may be the transfer of content through a peer-to-peer file distribution system, such as a BitTorrent protocol. Large files or groups of files may be pieced together using segments from thousands of different sources. Some or all of the users in such a system may simply be sharing segments derived from a single version of the content, or they may be sharing segments from many different versions. This can make it very difficult to trace back to the original traitor computer system 200 using traditional tracing methods.

Generally, a traitor tracing scheme includes two steps: an assignment step and a traitor detection step. The assignment step includes assigning decrypting keys or versions of content to different receiver computer systems 105 or users. The traitor detection step includes recovering a pirated rebroadcast 210 and identifying the traitor computer systems 200.

Under some traitor tracing schemes, the content protection system 102 updates decrypting keys periodically so as to more easily identify traitor computer systems 200, potentially even during the detection step. However, in other embodiments, the content protection system 102 uses a static traitor tracing scheme where the assignment step does not change in the middle of the detection step. In one embodiment, the traitor tracing scheme described herein conforms to the Advanced Access Content System (AACS) standards, which has been adopted as the access restriction scheme for Blu-ray Discs and uses the Advanced Encryption Standard to encrypt the content. The AACS allows licensors of content to revoke content access privileges of receiver computer systems 105 that have been identified as traitor computer systems 200.

When a pirated rebroadcast 210 of the content is recovered, one of the goals of the traitor tracing scheme is to identify each of the traitor computer systems 200 involved in the rebroadcast attack, whether one or many. As shown in FIG. 2, the pirated rebroadcast 210 may be recovered 215 at any time among a series of rebroadcasts. The content protection system 102 may recover 215 the pirated rebroadcast 210 after an initial rebroadcast from one or more of the receiver computer systems 105. Alternatively, the pirated rebroadcast 210 may be recovered 215 after several rebroadcasts by third-party systems 205 that did not receive an original broadcast of the content. Under either scenario, when the content protection system 102 recovers 215 the pirated rebroadcast 210, the content protection system 102 identifies the traitor computer systems 200 based on a tracing algorithm.

According to one embodiment, the tracing is done by scoring each receiver computer system 105 and incriminating the receiver computer system 105 that has a score which exceeds a specified threshold as a traitor computer system 200. Some traitor tracing schemes may attempt to detect a coalition of traitor computer systems 200, rather than individual traitor computer systems 200. In one embodiment of the present specification, the traitor tracing scheme identifies traitor computer systems 200 individually.

Some conventional traitor tracing schemes incriminate receiver computer systems 105 by measuring the score for each receiver computer system 105 against a threshold calculated using an assumed maximum coalition size. The tracing scheme detects at least one traitor computer system 200 (or "traitors") out of the assumed coalition size of traitors, assuming that the entire tracing process will simply be repeated when detecting the remaining traitors 200. However, this conventional approach is limited in two ways. First, the number of recovered rebroadcasts in order to be able to detect traitors from the coalition is calculated based on the assumed coalition size. Because the assignment code length is based on the number of recovered broadcasts, the assignment code length is decided in advance based on the assumed coalition size. This is limiting because, in practice, the coalition size is likely not known in advance, so such an approach is not generally practical. Second, detecting the remaining traitors in this approach does not make use of the knowledge gained from detecting previous traitors. This is limiting because the process is inefficient and results in poor traceability. Such an approach may also result in false incriminations of innocent receiver computer systems 105, or may result in incriminating a smaller coalition than actually existed.

Figure 3:
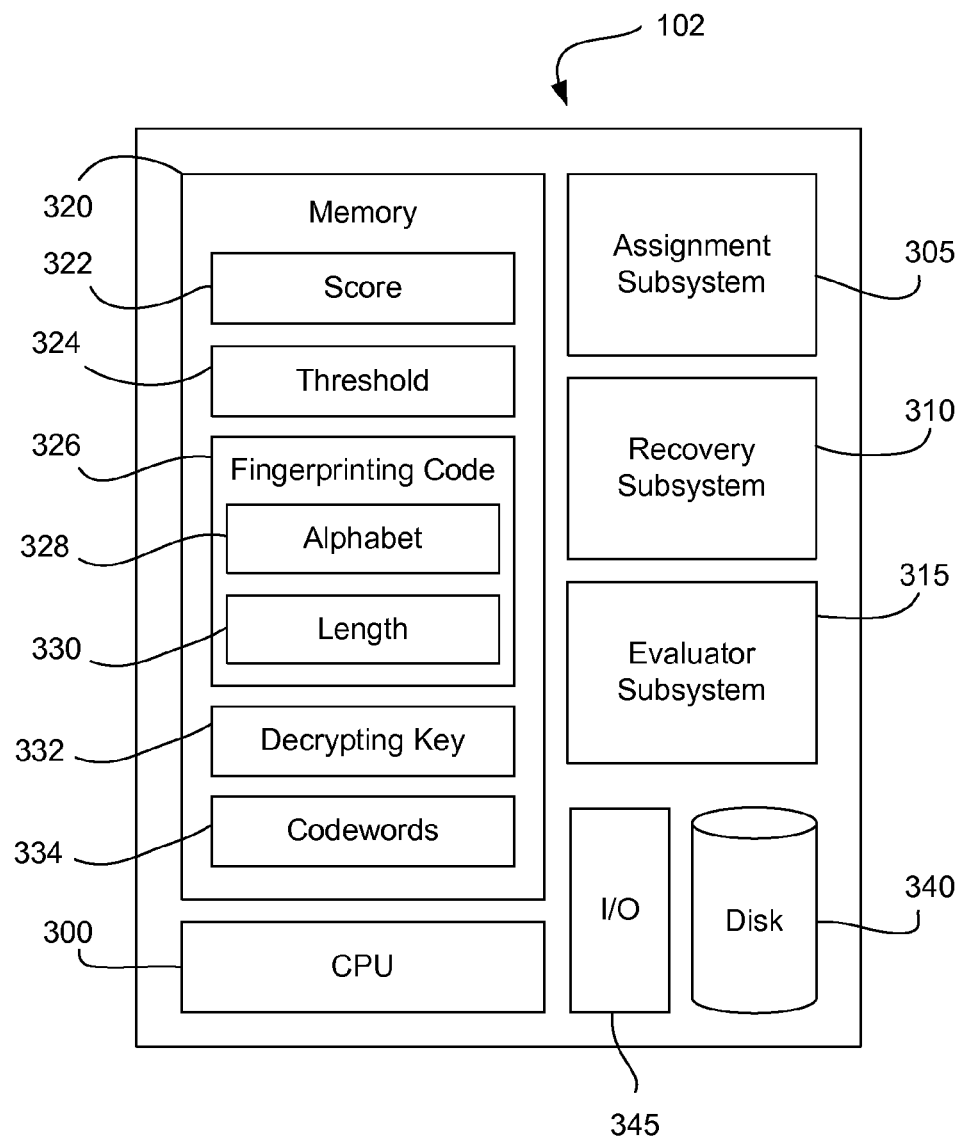
FIG. 3 depicts a schematic diagram of one embodiment of a content protection system.
Figure 4:
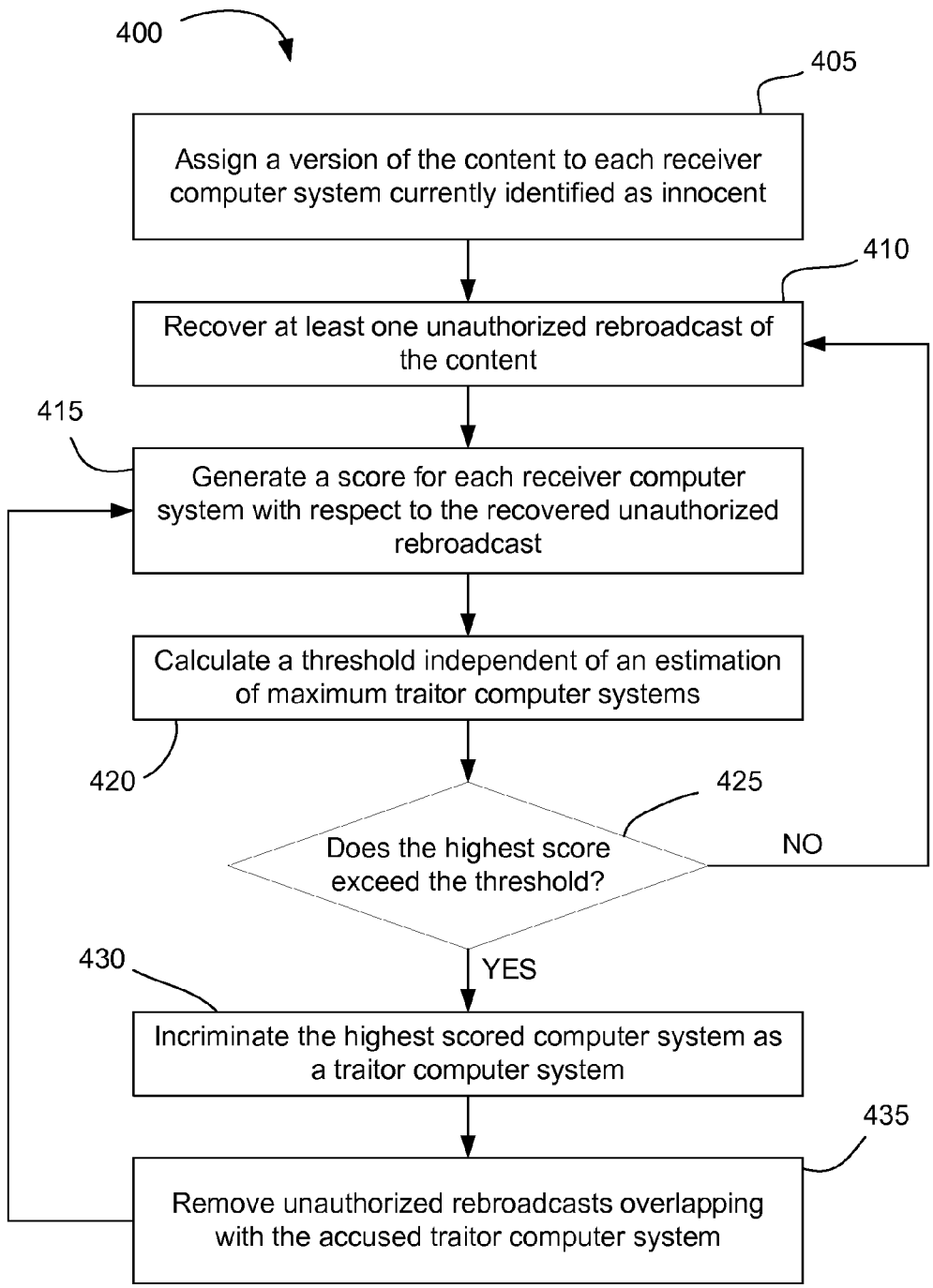
FIG. 4 depicts a flow diagram of one embodiment of a method for detecting a traitor computer system subject to a content protection system.

FIG. 3 depicts a schematic diagram of one embodiment of the content protection system 102 of FIG. 1. The depicted content protection system 102 includes various components, described in more detail below, that are capable of performing the functions and operations described herein. In one embodiment, at least some of the components of the content protection system 102 are implemented in a computer system. For example, the functionality of one or more components of the content protection system 102 may be implemented by computer program instructions stored on a computer memory device 320 and executed by a processing device such as a central processing unit (CPU) 300. The content protection system 102 may include other components, such as a disk storage drive 340, input/output devices 345, a distribution subsystem, a content database, or others. The content protection system 102 may be part of a larger system in some embodiments. In some embodiments, the content protection system 102 may be used to implement the method described herein as depicted in FIG. 4.

The illustrated content protection system 102 includes an assignment subsystem 305, a recovery subsystem 310, and an evaluator subsystem 315. The assignment subsystem 305 is configured to assign a version of protected content to each of a plurality of receiver computer systems 105 currently identified as innocent in communication with the content protection system 102. The recovery subsystem 310 is configured to recover at least one pirated rebroadcast 210 of the content. The evaluator subsystem 315 is configured to generate a score 322 for each of the plurality of receiver computer systems 105 with respect to the recovered pirated rebroadcast 210. The evaluator subsystem 315 then calculates a threshold independent of an estimation of maximum traitor computer systems 200, and checks the highest generated score against the threshold 324. If the highest generated score exceeds the threshold 324, the respective receiver computer system 105 is incriminated as a traitor computer system 200. In one embodiment, the evaluator subsystem 315 calculates the threshold based on the accumulated number of rebroadcasts due to undetected traitor computer systems 200, a length 330 of the fingerprinting code 326, and a size of an alphabet 328 used for the fingerprinting code 326.

In one embodiment of the content protection system 102, the version of protected content includes a fingerprinting code 326 of arbitrary length and a decrypting key 332 assigned to each of the receiver computer systems 105 currently identified as innocent based on the fingerprinting code 326. The recovery subsystem 310 recovers the pirated rebroadcast 210 of the content based on the fingerprinting code.

In one embodiment, the evaluator subsystem 315 generates the score 322 based on the number of overlaps between the recovered pirated content 215 and a codeword 334 of each of the receiver computer systems 105.

The scores 322, fingerprint codes 326, threshold 324, decrypting key 332, codewords 334, may be stored in the memory device 320, such that the content protection system 102 may re-use the data for further calculations or comparisons. The data may also be reported to an administrator of the content protection system 102 for viewing.

FIG. 4 depicts a flow diagram of one embodiment of a method 400 for detecting a traitor computer system 200 subject to the content protection system 102. The method 400 detects at least one traitor computer system 200 among a plurality of receiver computer systems 105 subject to the content protection system 102 that monitors distribution of protected content to the plurality receiver computer systems 105. Although the method 400 is described in conjunction with the content protection system 102 of FIG. 3, embodiments of the method 400 may be implemented with other embodiments of content protection systems 100.

In one embodiment, the content protection system 102 assigns 405 a version of the content to each of the receiver computer systems 105 that are currently identified as innocent. In one embodiment, after the traitor computer systems 200 are identified, the content protection system 102 may block the assignment of any new content to the traitor computer system 200. The incriminated computer systems may no longer receive the decryption keys or codes necessary to decrypt received protected content, or may no longer have access to the content protection system 102 to receive the content.

The content protection system 102 then recovers 410 at least one pirated rebroadcast 210 of the content. In one embodiment, assigning the version of content to each of the receiver computer systems 105 includes assigning a fingerprinting code 326 of arbitrary length to each version of content. The fingerprinting code 326 may generate a code used to detect piracy of content. The content protection system 102 may be able to recover the pirated broadcast based on the fingerprinting code 326. Consequently, the fingerprinting code 326 may be used to both identify a particular rebroadcast as a pirated rebroadcast 210, as well as to help identify the receiver computer system(s) 105 from which the pirated rebroadcast 210 originated.

In one embodiment, when the fingerprinting code 326 is assigned, a decrypting key 332 is assigned to each of the receiver computer systems 105 that are currently identified as innocent based on the fingerprinting code 326.

The content protection system 102 also generates 415 a score 322 for each of the receiver computer systems 105 with respect to the recovered pirated rebroadcast 210. In one embodiment, the score 322 is generated by scoring each of the receiver computer systems 105 with respect to the number of overlaps between the recovered pirated content 215 and a codeword 334 of each of the receiver computer systems 105. In one embodiment, the codeword 334 may be derived from the fingerprinting code 326, or may otherwise relate to the fingerprinting code 326.

The content protection system 102 then calculates 420 a threshold 324 independent of an estimation of maximum traitor computer systems 200. In one embodiment, the content protection system 102 calculates the threshold 324 in an absence of an a priori bound on the coalition size of total traitor computer systems 200. This allows the content protection system 102 to trace traitors 200 more accurately.

The content protection system then checks 425 the highest score of the generated receiver computer system scores 322 against the threshold 324. The scores 322 may be stored in a table according to the value of the scores 322, and may be mapped to their respective receiver computer systems 105.

If the highest score exceeds the threshold 324, the content protection system 102 then incriminates 430 the highest scored computer system as a traitor computer system 200. If the highest score does not exceed the threshold 324, the method returns to recovering 410 unauthorized rebroadcasts 210, and there are no more traitors 200 to incriminate.

The content protection system 102 then removes 435 any unauthorized rebroadcasts 210 overlapping with the accused traitor computer system 200, and returns to generating 415 scores 322 for the remaining receiver computer systems 105.

In one embodiment, the content protection system 102 calculates the threshold 324 based on the accumulated number of recovered rebroadcasts due to undetected traitor computer systems 200, the length 330 of the fingerprinting code 326, and the size of alphabet 328 used for the fingerprinting code 326. In an embodiment in which the scores are based on the codewords 334 derived for the receiver computer systems 105 from the fingerprinting code 326, and the threshold calculation is based on the fingerprinting code 326, the fingerprinting code 326 may be extendable and flexible, rather than be limited to a fixed length 330 or alphabet 328.

According to one embodiment, the method 400 also includes re-calculating the threshold 324 after removing 435 all pirated content found to be overlapping with the traitor computer system 200, and checking for additional traitor computer systems 200. Consequently, after a receiver computer system 105 has been incriminated as a traitor 200, or after a group of receiver computer systems 105 has been incriminated as a coalition of traitors 200, content that overlaps with the traitor computer system(s) 200 is removed. The threshold 324 may then be re-calculated using the new accumulated number of recovered rebroadcasts due to undetected traitors 200—from which the rebroadcasts due to identified traitors 200 have been removed. Updating the threshold in this manner allows the content protection system 102 to find additional traitor computer systems 200 in a more efficient manner than conventional traitor tracing schemes. The total traceability of the method 400 in this embodiment is linear. Additionally, the present method 400 may allow for the omission of rebroadcasts on some content or keys without causing the traitor tracing scheme to fail.

In one embodiment of the method 400, the content protection system 102 determines a final coalition of traitor computer systems 200 after re-calculating the threshold 324 such that all remaining receiver computer systems 105 fall below the threshold 324. In this scenario, the final coalition includes all traitor computer systems 200 that were incriminated based on the pirated rebroadcast 210. Consequently, while the present method does not depend on an a priori upper bound of coalition size, the method may be used to determine the actual coalition size.

In one embodiment, the content protection system 102 recovers additional unauthorized rebroadcasts 210 and repeats the process of generating scores 322 for the receiver computer systems 105 that are currently identified as innocent and incriminating the receiver computer systems 105 as traitors 200 whose scores exceed the threshold 324. As long as a score 322 exceeds the threshold 324, the content protection system 102 will continue to incriminate computer systems. When the scores 322 fall below the newly calculated threshold 324, all traitors 200 for the recovered rebroadcast 215 have been identified, and the content protection system 102 returns to recovering 410 pirated rebroadcasts.

According to one embodiment, an extendable fingerprinting code 326 without a prior bound on coalition size is described. A codeword over an alphabet Q is an l-tuple $x=(x_1, \ldots, x_l)$ where $x_i \in Q$ for $1 \le i \le l$. If a code $W=\{a^1, \ldots, a^n\} \subseteq Q^l$ has n codewords, then it is called an (l, n, q)-code where $|Q|=q$.

For any set of indices $T \subseteq [n]$, the set of pirate codewords due to T, denoted $desc(C_T)$ is defined by:

$$desc(C_T) = \{x \in Q^l : x_i \in \{a_i : a \in C_T\}, 1 \le i \le l\}$$

where $C_T = \{a^j | j \in T\}$ and $x_i$, $a_i$ are the i-th symbol of the codewords 334.

In other words, the descendent set $desc(C_T)$ is the set of pirate codewords that could be produced by the coalition of the set T. Partial codewords which are missing some positions in the pirate codeword are also taken into account. The missing portions are denoted by $\perp$. Formally, $desc\perp(C_T)$ is defined accordingly:

$$desc\perp(C_T) = \{x \in \{\{\perp\} \cup Q\}^l : \quad x_i \in \{\perp\} \cup \{a_i : a \in C_T\}, 1 \le i \le l\}$$

For the purpose of simplifying the notation, a pirate codeword due to the set T of a length i<l refers to codeword in $desc\perp(C_T)$ whose last l-i positions are filled with $\perp$.

In the present embodiment, a fingerprinting code is a pair of algorithms (CodeGen, Tracing) that generates a code for which it is possible to detect piracy:

CodeGen is an algorithm, given input (n, v, q) with a security parameter $v=\log(l/\epsilon)$ for some small $\epsilon$, that samples a pair (C, tk)←CodeGen(n, v, q) where C is an (l, n, q)-code defined over an alphabet Q, and tracing key tk is some auxiliary information to be used for tracing that may be empty.

Tracing is a deterministic algorithm that takes input the tracing key tk as well as a pair (c,T), where $c \in \{\{\perp\} \cup Q\}^l$ and $T \subseteq [n]$, and it outputs a codeword-index $t \in [n] \backslash T$ or fails. The fingerprinting code 326 is called open if tk is empty.

The fingerprinting code may be determined by the assignment subsystem 305. For an extendable fingerprinting code without an a priori bound on the coalition size, the $CodeGen_R$ (n, v, q) algorithm creates a code C whose codewords are sampled from the codeword-space $Q^l$ randomly, i.e., for all $y \in Q$ it holds that $Pr[c_i=y]=1/q$ for any $c \in C$ and $i=1, \ldots, l$. The randomly constructed code is denoted by $C_R$. The corresponding tracing algorithm is given as:

| $Tracing_R$(Pirate Rebroadcast p, disabled set T) |
|---|
| 1.    Let l be the actual size (without $\perp$) of the rebroadcast p |
| 2.    Let $s_j = |\{i \mid p_i = w_i^j\}|$ |
| 3.    Reorder the users so that $s_i > s_{i+1}$ for $i \ge 1$ holds |
| 4.    set k = 1 and $s_0 = 0$ |
| 5.    repeat |
| 6.      set threshold = $\log \frac{q \cdot c_k}{(l - \sum_{i=0}^{k-1} c_i) \cdot \epsilon} \frac{n}{\epsilon}$ |
| 7.      If $s_k <$ threshold |
| 8.        then break |
| 9.      k = k + 1 |
| 10.    until break |
| 11.    if k $\ge$ 2 then output $\{u_1, \ldots, u_k - 1\}$ where $u_i$ has score $s_i$ |

The $Tracing_R$ algorithm shown above may be executed by the evaluation subsystem 315. After a feedback observed in the system, the content protection system 102 scores each receiver computer system 105 with the number of overlaps between the pirated rebroadcast 210 and the receiver computer system's unique codeword 334, as shown above in step 2 of the $Tracing_R$ algorithm. After sorting the scores at step 3, the tracing algorithm checks the highest score 322: if the highest score 322 exceeds the threshold 324 then the corresponding receiver computer system 105 is incriminated as a traitor computer system 200. This threshold 324 is calculated at step 6 in the tracing algorithm. The threshold 324 does not depend on the estimation of coalition size; instead, it only depends on the length of the pirated rebroadcast 215 (the rebroadcast due to the undetected traitors 200), the length 330 of fingerprinting code 326 and the size of the marking alphabet 328 in the fingerprinting code 326. If the receiver computer system 105 with the highest score 322 is accused, then the evaluation subsystem 315 will remove all the unauthorized rebroadcasts overlapping with the accused computer system and re-calculate a new threshold 324. The receiver computer systems 105 are re-scored, and the new highest score 322 is checked against the newly recalculated threshold 324. This procedure continues until all remaining receiver computer systems 105 in the order are found to be below the updated threshold 324. The content protection system 102 will continue recovering additional rebroadcasts before calling the evaluation subsystem 315 again to find new traitor computer systems 200

Given a secret fingerprinting code $C_R$ that is constructed randomly and sampled uniformly from the codeword space $Q_1$, the corresponding Tracing$_R$ is the algorithm described above. If the Tracing$_R$ algorithm outputs a set of size t upon detecting a pirated rebroadcast p, then the output set is a subset of traitors with probability of at least 1-t·ϵ. The proof of this theorem uses a Chernoff bound where the probability of a particular receiver computer system 105 having a score 322 of the calculated threshold 324 out of/positions is computed. If the score 322 exceeds the threshold 324 given in Tracing$_R$, then the accused computer system is among the traitor coalition with high probability. The tracing key tk is set as the code $C_R$, such that the fingerprinting code 326 is a secret code.

Additionally, there is no T-possible pirated rebroadcast p with |T|=t and error rate less than tϵ for $$l \geq \log_{\frac{q}{e \cdot t}} \frac{n}{\epsilon}.$$

At any time the i-th detected user would have a score of $$s_i = \log_{\frac{q\alpha_i}{e}} \frac{n}{e}$$

exceeding the threshold where $\alpha_i$ corresponds to the ratio of the score of that particular receiver computer system to the partial pirate rebroadcast due to the undetected traitors. Because the receiver computer system 105 has the highest score among the other undetected traitors, it satisfies that $\alpha_i \geq 1/t$. Therefore, $$s_i < \log_{\frac{q}{e \cdot t}} \frac{n}{\epsilon}.$$

In general, the length of the pirated rebroadcast due to the traitor coalition T would be bounded by the formula:

$$l \leq \sum_{i=1}^{t} s_i \leq t \log_{\frac{q}{e \cdot t}} \frac{n}{\epsilon}$$

The code is not only independent of an a priori bound on the coalition size, but the tracing algorithm shown above does not depend on the length of the actual fingerprinting code. Moreover, each position of the code can be considered as an independent distribution from other positions in the code $C_R$. Thus, the length of the fingerprinting code may be extended without affecting the success of the tracing algorithm, and tracing continues smoothly. This example also supports a low pirated rebroadcasting threshold.

Embodiments of the fingerprinting code 326 and traitor tracing scheme described herein have several advantages over conventional schemes. A robust fingerprinting code tolerates traitor computer systems 200 that choose not to rebroadcast some messages. A tracing algorithm for fingerprinting code that does not require an a priori upper-bound on coalition size may be more successful in detecting a traitor computer system. The length of the fingerprinting code which refers to the traitor detection method of the code may be extended because the method does not depend on the length of the code or the distribution of the markings over the code.

An embodiment of a content protection system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including some or all of the operations described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
 a computer readable storage device to store a computer readable program, wherein the computer readable program, when executed on a computer, causes the computer to perform operations for detecting at least one traitor computer system among a plurality of receiver computer systems subject to a content protection system that monitors distribution of protected content to the plurality of receiver computer systems, the operations comprising:
  assigning a version of the content to each of the plurality of receiver computer systems that are currently identified as innocent;
  assigning a fingerprint code comprising an arbitrary length and an arbitrary alphabet to the version of the content for each of the plurality of receiver computer systems;
  recovering at least one unauthorized rebroadcast of the content;
  generating a score for each of the plurality of receiver computer systems with respect to the recovered unauthorized rebroadcast;
  calculating a threshold independent of an estimation of maximum traitor computer systems;
  checking a highest score against the threshold;
  incriminating a receiver computer system having the highest score above the threshold as a traitor computer system;
  removing any unauthorized rebroadcasts overlapping with the traitor computer system;
  re-calculating the threshold after removing the unauthorized rebroadcasts overlapping with the traitor computer system; and
  checking for additional traitor computer systems.

2. The computer program product of claim 1, wherein the computer program product, when executed on the computer, causes the computer to perform additional operations, comprising:
 calculating the threshold in an absence of an a priori bound on a coalition size of total traitor computer systems.

3. The computer program product of claim 1, wherein the computer program product, when executed on the computer, causes the computer to perform additional operations, comprising:
 blocking assignment of new content to the traitor computer system.

4. The computer program product of claim 1, wherein assigning the fingerprinting code further comprises determining the fingerprint code independently from the estimation of maximum traitor computer systems.

5. The computer program product of claim 4, wherein assigning the fingerprinting code comprises assigning a decrypting key, based on the fingerprinting code, to each of the plurality of receiver computer systems that are currently identified as innocent.

6. The computer program product of claim 4, wherein generating the score comprises scoring each of the plurality of receiver computer systems with respect to a number of overlaps between the recovered unauthorized content and a codeword of each of the plurality of receiver computer systems.

7. The computer program product of claim 4, wherein the computer program product, when executed on the computer, causes the computer to perform additional operations, comprising:
 calculating the threshold based on an accumulated number of rebroadcasts due to undetected traitor computer systems, a length of the fingerprinting code, and a size of an alphabet used for the fingerprinting code.

8. The computer program product of claim 1, wherein the computer program product, when executed on the computer, causes the computer to perform additional operations, comprising:
 determining a final coalition of traitor computer systems after re-calculating the threshold such that all remaining receiver computer systems fall below the threshold,
 wherein the final coalition comprises all of the traitor computer systems incriminated based on the unauthorized rebroadcast.

9. The computer program product of claim 1, wherein the computer program product, when executed on the computer, causes the computer to perform additional operations, comprising:
 recovering additional unauthorized rebroadcasts;
 repeating generating the score, calculating the threshold, checking the highest score against the threshold, incriminating the receiver computer system having the highest score, and removing the overlapping unauthorized rebroadcasts.

10. A method for detecting at least one traitor computer system among a plurality of receiver computer systems, comprising:
 assigning a version of protected content to each of a plurality of receiver computer systems that are currently identified as innocent by a content protection system that monitors distribution of the protected content to the plurality of receiver computer systems;
 assigning a fingerprint code comprising an arbitrary length and an arbitrary alphabet to the version of the content for each of the plurality of receiver computer systems;
 recovering at least one unauthorized rebroadcast of the content;
 generating a score for each of the plurality of receiver computer systems with respect to the recovered unauthorized rebroadcast;
 calculating a threshold independent of an estimation of maximum traitor computer systems;
 checking a highest score against the threshold;
 incriminating a receiver computer system having the highest score above the threshold as a traitor computer system;
 removing any unauthorized rebroadcasts overlapping with the traitor computer system;

re-calculating the threshold after removing the unauthorized rebroadcasts overlapping with the traitor computer system; and checking for additional traitor computer systems.

11. The method of claim 10, wherein assigning the fingerprinting code further comprises determining the fingerprint code independently from the estimation of maximum traitor computer systems.

12. The method of claim 11, wherein assigning the fingerprinting code comprises assigning a decrypting key, based on the fingerprinting code, to each of the plurality of receiver computer systems that are currently identified as innocent.

13. The method of claim 11, wherein generating the score comprises scoring each of the plurality of receiver computer systems with respect to a number of overlaps between the recovered unauthorized content and a codeword of each of the plurality of receiver computer systems.

14. The method of claim 11, further comprising calculating the threshold based on an accumulated number of rebroadcasts due to undetected traitor computer systems, a length of the fingerprinting code, and a size of an alphabet used for the fingerprinting code.

15. A system for detecting a traitor computer system in a content distribution system, comprising:
 a content protection system at least partially implemented on a computer device, the computer device comprising a storage device, a processor, and memory, the content protection system also comprising:
  an assignment subsystem configured to assign a version of protected content to each of a plurality of receiver computer systems currently identified as innocent and to assign a fingerprint code comprising an arbitrary length and an arbitrary alphabet to the version of the content for each of the plurality of receiver computer systems;
  a recovery subsystem configured to recover at least one unauthorized rebroadcast of the content; and
  an evaluator subsystem configured to:
   generate a score for each of the plurality of receiver computer systems with respect to the recovered pirated rebroadcast;
   calculate a threshold independent of an estimation of maximum traitor computer systems;
   check a highest score against the threshold;
   incriminate a receiver computer system having the highest score above the threshold as a traitor computer system; and
   remove any unauthorized rebroadcasts overlapping with the traitor computer system;
   re-calculate the threshold after removing the unauthorized rebroadcasts overlapping with the traitor computer system; and
   check for additional traitor computer systems.

16. The system of claim 15, wherein the version of the content comprises:
 the fingerprinting code determined independently from the estimation of maximum traitor computer systems; and
 a decrypting key assigned to each of the plurality of receiver computer systems currently identified as innocent based on the fingerprinting code,
 wherein the recovery subsystem is configured to recover the unauthorized rebroadcast of the content based on the fingerprinting code.

17. The system of claim 16, wherein the evaluator subsystem is further configured to generate the score based on a number of overlaps between the recovered pirated content and a codeword of the each of the plurality of receiver computer systems.

18. The system of claim 16, wherein the evaluator subsystem is further configured to calculate the threshold based on an accumulated number of rebroadcasts due to undetected traitor computer systems, a length of the fingerprinting code, and a size of an alphabet used for the fingerprinting code.

* * * * *